Sept. 22, 1953     H. RAMACHER     2,652,678
GATHERING REEL
Filed April 3, 1951

INVENTOR.
HENRY RAMACHER
BY Royal Daily

ATTORNEY

Patented Sept. 22, 1953

2,652,678

UNITED STATES PATENT OFFICE 2,652,678

GATHERING REEL

Henry Ramacher, Vallecito, Calif.

Application April 3, 1951, Serial No. 218,997

2 Claims. (Cl. 56—328)

My invention relates to improvements in a flexible finger for a fruit or nut harvester.

An important object of the invention is to provide a flexible finger which is adjustable to, and behind, a fruit or nut engaging finger.

A further object is to provide a flexible finger fastened to a frame just back of the solid finger bars and rotate in the same direction which will rub or press firmly on the ground so that when passing over depressions on the ground said flexible fingers will drop into the depressions and roll the fruit of nuts out of said depressions.

A further object of the invention is to provide a flexible finger back of the solid finger bars so that said flexible fingers, on level ground, will roll the fruit or nuts into a windrow in front of revolving reel which are then picked up by the solid teeth.

A further object of the invention is to provide a flexible finger back of the solid finger bars which can be adjusted on pivotal points so that the pressure of the flexible fingers may be made to press heavy or light on fruit or nuts according to their quality to be rolled or brought forward into a windrow.

Other objects and advantages of the invention will be apparent during the course of the following description.

Figure 1:
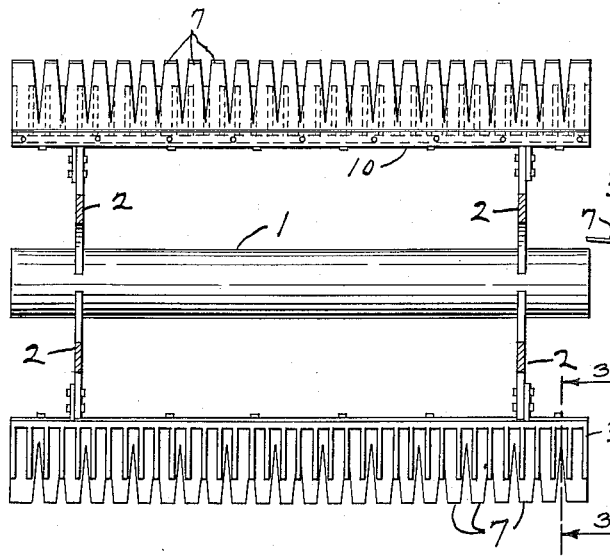
Figure 1 is a front elevation of the pick up assembly of a fruit and nut harvester.

In the drawings, wherein for the purpose of illustration, is shown a preferred embodiment of my invention, the numeral 1 designates a pick-up reel mounting sleeve which is provided with a hole 1a.

The numeral 2 designates a plurality of connecting arms to which is attached rigid fruit or nut lifting fingers 3. Numeral 4 shows the maximum diameter of travel of rigid fingers 3; numeral 5 shows the normal surface of ground and numeral 6 gives an example of a depression, or hole, in a level piece of ground.

The numeral 7 designates flexible finger which operates behind, or back of the lifting finger 3, which flexible finger will point backward and downward so that said flexible fingers 7 will rub or press firmly on the ground and when they pass over a depression or low spot on the ground these flexible fingers will drop down in these depressions and low places and roll the fruit or nuts out of said depression or hole. 8 demonstrates and shows the fruit or nuts being lifted by the rigid fingers 3 on normal or level ground and 9 shows the fruit or nuts being moved from the depression or hole by the flexible finger 7.

The numeral 10 designates the flexible finger mounting plate which is attached to the connecting arms 2, said connecting arms have holes 11 contained therein for receiving suitable securing elements such as bolt and nut assemblies in order to permit raising and lowering of the mounting plates 10 to adjust the flexible fingers 7.

Figure 2:
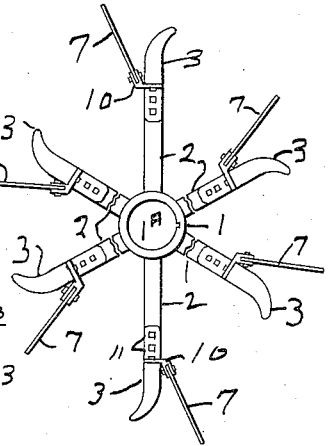
Figure 2 is a side elevation of a fruit and nut harvester pick up reel.
Figure 3:
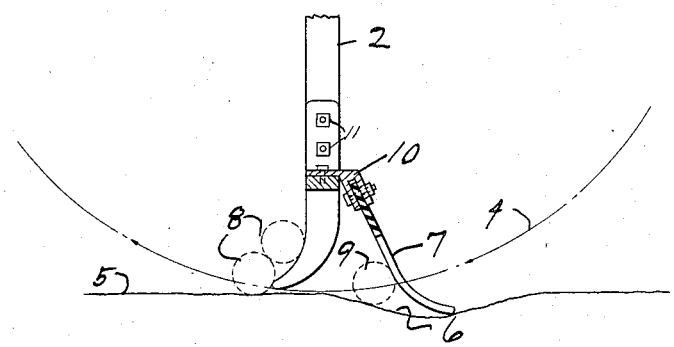
Figure 3 is an enlarged sectional view along line 3—3 of Figure 1.

The operation of the flexible finger for a fruit or nut harvester is as follows:

The pick up assembly wheel Figure 2 has a plurality of connecting arms 2 thereon which have rigid fruit lifting fingers 3 on the ends thereof which fingers 3 pick up the fruit or nuts from the ground to where centrifugal force will project the fruit in a curved arc unto a transverse conveyor of the gathering machine, but practice has shown that this form of picking up fruit or nuts leaves many pieces of the fruit or nuts in holes or depressions on the ground and in my invention of applying a flexible finger 7 behind the lifting fingers 3 it is possible to roll the fruit or nuts out of the depressions or holes unto normal or level ground where the lifting or pick up fingers 3 can reach them and thus project them into the forward conveyor suspended in front of the pick up assembly, the connecting arms 2 have numerous sets of holes 11 therein for attaching the flexible finger mounting plate 10 to which the flexible fingers are attached so that the flexible fingers 7 may be varied up or down to work the terrain.

Having thus described my invention, I claim:

1. In a fruit or nut harvester, a cylindrical sleeve, a pick-up reel assembly mounted on said sleeve and including a plurality of radially extending arms spaced inwardly from the ends of said reel, each of said arms having a plurality of openings therein a forwardly extending lifting finger projecting from the outer end of each of said arms, a mounting plate connected to each of said arms and provided with a plurality of spaced openings therein which register with the aforementioned openings in said arms, securing elements extending through said registering openings for maintaining said mounting plates immobile in their adjusted positions, and a flexible finger connected to each of said mounting plates and arranged angularly with respect to said lifting fingers.

2. In a fruit or nut harvester, a cylindrical sleeve, a pick-up reel assembly mounted on said sleeve and including a plurality of radially extending arms spaced inwardly from the ends of said reel, each of said arms having a plurality of openings therein a forwardly extending lifting finger projecting from the outer end of each of said arms, a mounting plate connected to each of said arms and provided with a plurality of spaced openings therein which register with the aforementioned openings in said arms, securing elements extending through said registering openings for maintaining said mounting plates immobile in their adjusted positions, and a flexible finger connected to each of said mounting plates, said flexible fingers pointing backwardly and downwardly and arranged behind corresponding lifting fingers.

HENRY RAMACHER.

References Cited in the file of this patent

UNITED STATES PATENTS

| Number | Name | Date |
|---|---|---|
| 458,614 | Buddenberg | Sept. 1, 1891 |
| 730,632 | Galbreath | June 9, 1903 |
| 1,650,796 | Kellogg | Nov. 29, 1927 |
| 1,921,651 | Behling | Aug. 8, 1933 |
| 2,482,355 | McBride | Sept. 20, 1949 |

FOREIGN PATENTS

| Number | Country | Date |
|---|---|---|
| 91,989 | Germany | June 10, 1897 |
| 199,635 | Germany | June 23, 1908 |